March 3, 1936.  G. M. SHANOR  2,032,509
WELLHOLE SAMPLER
Filed April 27, 1935
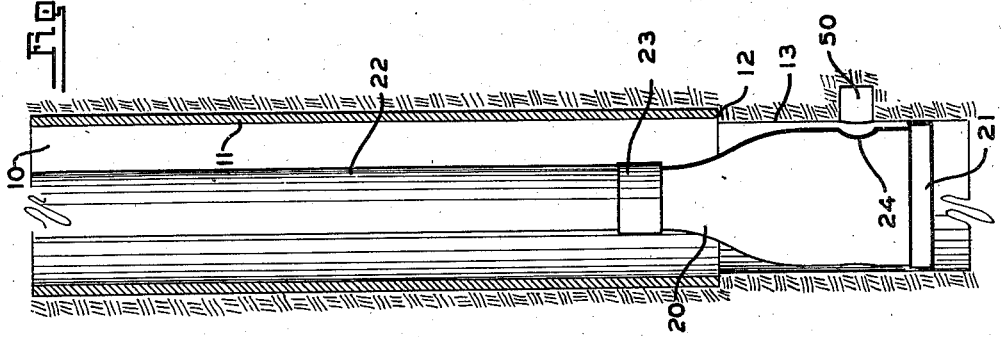
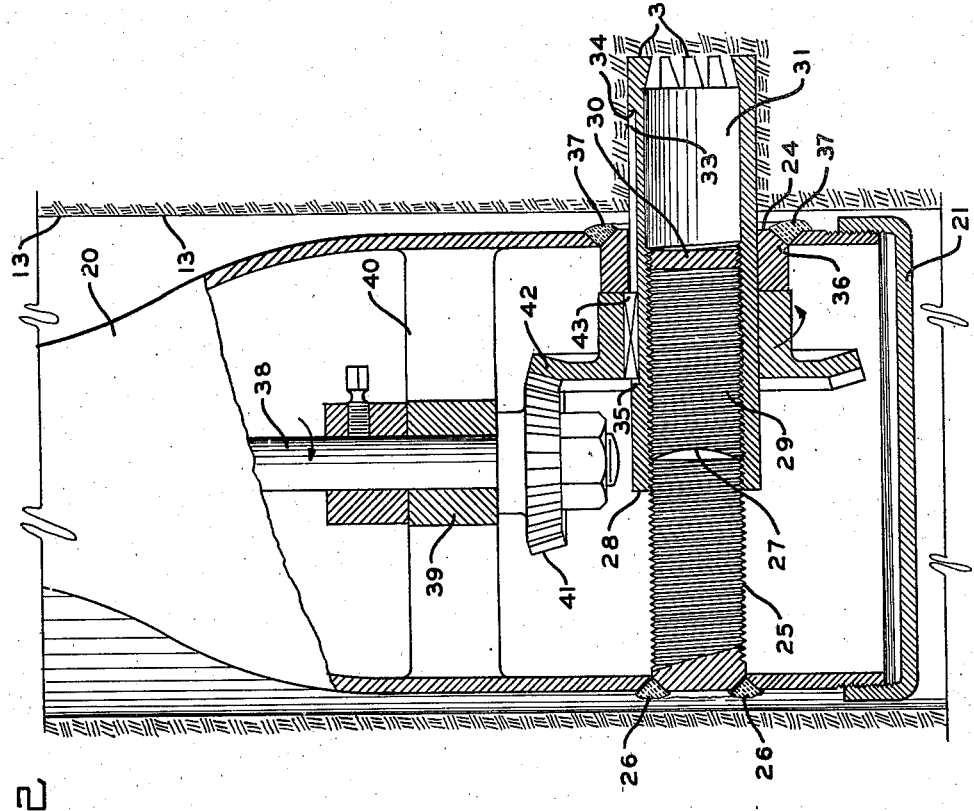
INVENTOR.
GEORGE M. SHANOR
BY
ATTORNEYS.

Patented Mar. 3, 1936

2,032,569

UNITED STATES PATENT OFFICE 2,032,569

WELLHOLE SAMPLER

George M. Shanor, Vernon, Tex., assignor to Phillips Petroleum Company, Bartlesville, Okla., a corporation of Delaware Application April 27, 1935, Serial No. 18,657

6 Claims. (Cl. 255—1)

This invention relates to a device for obtaining geological samples from the various strata through which a well hole has penetrated, and in particular relates to a sampling apparatus for taking accurate geological samples from any desired stratum penetrated by the well hole.

In the course of drilling various types of well holes it is often desirable that the drill operator have knowledge of the geological strata to be encountered. Oftentimes accurate knowledge of these strata will enable the drilling operations to be executed in a most efficient manner for the reason that the type of strata to be encountered is known beforehand and the hole can be drilled accordingly. Moreover when a plurality of holes have been drilled in a locality important knowledge and information can be had by observing the geological samples taken from the various strata of the several holes, and in this manner the drill operator is provided with a guide indicating the type and character of the strata to be encountered. With such information large areas may be mapped showing their subterranean character. By use of such a guide drilling operations are greatly expedited for the operator is forewarned and knows with reasonable accuracy what drilling problems to expect and guard against. Such beneficial knowledge of sub-surface conditions as last described is possible only when the geological samples taken from the well hole are true and accurate representations of the stratum from which they are supposed to come. When the samples are not true the compilation of information relating to the subterranean character of the land in which the well holes are being drilled is then of no value and often causes difficulties and expense far in excess of those encountered if no knowledge of the subterranean characteristics of the land were known.

The value of this invention resides in the fact that it furnishes the best type of subterranean geological sample parallel to the plane of the strata to be tested for conditions of permeability, porosity, texture, chemical analysis, saturation, and other tests necessary for repressuring, acid treating, water flooding, shooting and numerous other well conditioning operations. By use of this invention it is also possible to determine depths of shale breaks or impervious sand streaks which information is needed when setting packers for repressuring and in water shutting-off operations.

Many well hole sampling tools and apparatuses have been devised but they will not operate satisfactorily to remove from a well hole a true and reliable sample accurately representative of the particular geological stratum occurring at the depth from which the sample is removed.

The object of this invention is to provide a device for obtaining true and accurate subterranean geological information.

Another object of this invention is to provide a device for removing accurate geological samples from a well hole which are truly representative of the stratum from whence they are removed.

Still another object of this invention is to provide a sampling device for well holes whereby there may be removed a true and accurate sample of the geological formation occurring at any particular depth within the hole.

A still further object of this invention is to provide a device for removing accurate geological samples from a well hole which are truly representative of the strata from whence they come and which retains upon removal from the well hole the same association of its components as was present in its original form.

Additional objects and advantages of this invention will become apparent upon consideration of the following specification describing and explaining the same, and from a consideration of the attached drawing forming a part thereof and wherein like reference numerals throughout the several views refer to like parts; and wherein, Fig. 1 illustrates the device for removing geological samples from a well hole, and Fig. 2 is an enlarged illustration of the same device shown partly in vertical cross section.

From a consideration of Fig. 1 it will be seen that a well hole 10 has been formed and a casing pipe 11 secured therein which projects down into the hole to the level 12. The remaining part of the hole below the casing pipe, namely the portion 13, does not include any pipe casing. A device for removing geological samples from the well hole is shown lowered thereinto, and includes a housing 20, a bottom closure plate 21, a string of tubing 22 to support the sampling device, and a connection 23 for supporting the housing of the sampling device to the string of tubing. It will be noted that the sampling device or sampler is constructed so as to provide a window or aperture 24 in one of the side walls thereof.

The details of the geological sampling device are illustrated in Fig. 2, and said device contains within the housing 20 a screw threaded stub shaft 25 disposed substantially at right angles to a side wall thereof and welded in place as shown at 26. The shaft 25 terminates in a stub or blunt end 27 at a point approximately centrally of the interior of the housing. The window or aperture 24 formed in the side wall of the housing is positioned substantially diametrically opposite the axis of the shaft 25. Such arrangement is desirable for the reason that a projectable and retractable tube or bit 28 for taking geological samples is mounted on the shaft 25 and is movable with respect thereto and is adapted to be projected and retracted through the window 24 to remove geological samples from the well hole as will later be described. An inner portion of the tube or bit is provided with screw threads 29 which are engageable with and complementary to the screw threads of the stub shaft 25. A division plate or plug 30 divides the interior of the tube 28 thus forming a chamber 31 in the end of the bit which is adapted to be projected and retracted through the window 24. On this end of the bit 28 is formed a cutting edge which may be in the form of a plurality of cutting teeth 32.

The outer periphery of the tube 28 is continuous except for a relatively long and narrow guideway 33 formed longitudinally thereof which terminates at its outer end in a stop 34 and at its inner end in a stop 35.

A bearing ring 36 to support the bit 28 is positioned in the window 24 of the housing 20 and is secured in place by the welds 37.

Extending continuous with the string of tubing 22 and housed thereby is a shaft 38 which extends down into the housing 20 and is journaled within the bearing 39 supported on the spider 40. A beveled gear 41 is fastened to the end of shaft 38 beneath the spider 40 and the teeth thereof are adapted to mesh with the teeth of bevel gear 42 mounted upon the core 28. It will be noted that bearing 36 for the core 28 also serves as a thrust ring for the gear 42 to prevent its disengagement with gear 41. Secured to the inner periphery of gear 42 is a key 43 positioned within the guideway 33 formed longitudinally of the outer periphery of tube 28.

Mounted upon the shaft 38 above the spider 40 is a stop ring 44 which may be secured to the shaft by means of the screw 45 to prevent the housing 20 and the parts contained therein from moving upwardly upon the shaft when it is rotated to actuate the sample removing device as will now be described.

It is to be assumed that a well hole has been drilled as illustrated in Fig. 1 and it is desired to acquire geological samples of the various strata lying below the casing pipe. The sample taking device encased in the housing 20 and supported by the string of tubing 22 is now lowered into the well hole to any desired depth. The sample removing tube or bit 28 is within the housing 20 in a retracted position. Now by rotating in any suitable manner from the surface, or at any other convenient point, the shaft 38 in a clockwise direction as indicated by the arrow the gear 41 secured to the lower end thereof will likewise be caused to rotate in the same direction and will drive the gear 42 in the direction indicated. By virtue of the key 43, which is secured to the inner periphery of gear 42 and in engagement with the guideway 33 formed in the tube 28, the tube or bit 28 will be rotated upon the stub shaft 25. As the result of such motion the screw threads of the shaft 25 and the screw threads 29 of the tube 28 will cause the tube or bit to move away from the stub shaft and be projected out through the window 24 and into the side wall of the well hole in the manner illustrated in Fig. 2. As the teeth 32 of the bit contact the well hole wall they bore into the face thereof and the tube penetrates the stratum at that particular level as shown in Fig. 2, and takes from the formation a representative sample of that particular stratum. The geological sample will then be contained in the chamber 31 of the tube 28 and by reversing the direction of rotation of the shaft 38 the rotative direction of the gears 41 and 42 will be reversed causing the bit to retract carrying with it the geological sample, and leaving a cored out place such as the one shown at 50 in Fig. 1.

With the tube 28 now completely retracted and within the housing 20 the entire device may be raised to the surface and the sample examined.

By repeating the above described operation, at different depths within the well hole samples and specimens of the various strata may be obtained.

The present invention has been illustrated and described with the sample removing tube or bit disposed in a horizontal plane with respect to the well hole, however, it is to be understood that this invention is not limited to any such arrangement, and if desired the geological sample removing tube or bit, by minor arrangement of parts, may be operated so as to be retracted and projected in a plane at any desired angle with respect to the well hole walls. It should be further appreciated that the type of well hole in which the sampler is shown and the means for lowering and supporting it therein form no material part of this invention and in no manner restrict the same. The sampler can be used to equal advantage in well holes formed by either rotary or cable tool drilling, or any other method, and it is immaterial as far as this invention is concerned whether the well hole contains a casing pipe or not. Furthermore other approved means besides a tubing, such as a drill pipe, may be used to lower and support the sampler in the well hole.

What I claim and desire to secure by Letters Patent is:

1. A device for obtaining geological samples from a well hole comprising a screw threaded shaft, an internally threaded coring bit mounted thereon, and means for rotating said bit to project it into the face of a well hole wall and cut therefrom a geological sample.

2. A device for obtaining subterranean samples from a well hole comprising an internally screw threaded hollow rotatable coring bit mounted on a stationary screw threaded shaft, driving means for rotating said bit and projecting it from said shaft and into the face of a well hole to core therefrom a sample.

3. A device for obtaining subterranean geological samples from a well hole comprising an internally screw threaded hollow coring bit mounted on a stationary screw threaded shaft and disposed and supported thereby in substantially a horizontal plane within a well hole, driving means for said bit to project it from said shaft and into the face of a well hole and cut therefrom a geological sample.

4. A device for obtaining subterranean samples from a well hole comprising an internally screw threaded coring bit mounted on a stationary externally threaded shaft, driving means for said bit to project it from said shaft and into the face of a well hole and at substantially a right angle thereto and cut therefrom a sample.

5. A coring device for obtaining subterranean samples from a well hole, the same comprising a casing having a window in a wall thereof, a screw threaded shaft formed integral with an interior wall thereof and having its axis diametrically opposed to the center of said window, a rotatable hollow coring bit having a threaded interior portion mounted on said shaft and retractable and projectable thereon for movement in and out of said window upon rotation, a bevelled gear keyed to said core and means to rotate the same to project and retract said core.

6. A coring device for obtaining subterranean samples from a well hole comprising a housing having a window formed in a wall thereof, a screw threaded shaft integrally attached to the interior of said housing and so disposed therein as to have the axis thereof diametrically opposite the center of said window, a hollow internally screw threaded coring bit mounted on said shaft and projectable and retractable thereon and through said window.

GEORGE M. SHANOR.